(12) United States Patent
Kühne

(10) Patent No.: US 10,773,626 B2
(45) Date of Patent: *Sep. 15, 2020

(54) ADJUSTABLE HEADREST ENABLING SIDEWARD LEANING AND SECLUSION

(71) Applicant: Safran Seats USA LLC, Gainesville, TX (US)

(72) Inventor: Manon Kühne, Delft (NL)

(73) Assignee: Safran Seats USA LLC, Gainesville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,221

(22) Filed: Aug. 15, 2019

(65) Prior Publication Data

US 2019/0366897 A1 Dec. 5, 2019

Related U.S. Application Data

(63) Continuation of application No. 15/561,994, filed as application No. PCT/US2016/025207 on Mar. 31, 2016, now Pat. No. 10,421,381.

(60) Provisional application No. 62/140,490, filed on Mar. 31, 2015.

(51) Int. Cl.
 *B60N 2/885* (2018.01)
 *B60N 2/58* (2006.01)
 *B64D 11/06* (2006.01)

(52) U.S. Cl.
 CPC .............. *B60N 2/885* (2018.02); *B60N 2/58* (2013.01); *B64D 11/0642* (2014.12)

(58) Field of Classification Search
 CPC ....... B60N 2/58; B60N 2/885; B64D 11/0642
 See application file for complete search history.

(56) References Cited

U.S. PATENT DOCUMENTS

| | | | | |
|---|---|---|---|---|
| 57,926 | A ‡ | 9/1866 | La France et al. | .... B60N 2/885 397/407 |
| 4,440,443 | A ‡ | 4/1984 | Nordskog | ................ A47C 7/38 297/397 |

(Continued)

FOREIGN PATENT DOCUMENTS

| | | |
|---|---|---|
| EP | 1449713 | ‡ 8/2004 |
| JP | 2006305193 | ‡ 11/2006 |

OTHER PUBLICATIONS

International Patent Application No. PCT/US2016/025207, Search Report and Written Opinion, dated Jun. 23, 2016.‡

(Continued)

*Primary Examiner* — James M Ference

(74) *Attorney, Agent, or Firm* — Kilpatrick Townsend & Stockton LLP

(57) ABSTRACT

A passenger seat headrest includes a body and a side wing. The body includes a forward side, an aft side distal from the forward side, a first side extending between the forward side and the aft side, and a second side distal from the first side and extending between the forward side and the aft side. The side wing is pivotably connected to the first side of the body and is pivotable between a stowed position, at which the side wing is positioned against the forward side of the body, and a deployed position, at which the side wing is spaced apart from the forward side of the body.

15 Claims, 13 Drawing Sheets

(56) References Cited

U.S. PATENT DOCUMENTS

| | | | | |
|---|---|---|---|---|
| 5,669,665 A ‡ | 9/1997 | Nowak | B60N 2/2803 | 297/284.9 |
| 6,123,389 A ‡ | 9/2000 | O'Connor | A47C 7/383 | 297/397 |
| 6,139,106 A ‡ | 10/2000 | Aldridge | A61C 19/00 | 297/391 |
| 6,250,716 B1 ‡ | 6/2001 | Clough | A47C 7/383 | 297/408 |
| 6,305,749 B1 ‡ | 10/2001 | O'Connor | A47C 7/383 | 297/397 |
| 6,513,871 B2 ‡ | 2/2003 | Bartels | B60N 2/885 | 297/216.12 |
| 6,744,898 B1 ‡ | 6/2004 | Hirano | H04R 5/023 | 381/333 |
| 6,840,577 B2 ‡ | 1/2005 | Watkins | A61G 5/1064 | 297/284.9 |
| 7,080,886 B2 ‡ | 7/2006 | Bauer | A47C 7/38 | 297/409 |
| 7,341,302 B2 ‡ | 3/2008 | Slade | B60N 2/062 | 296/65.01 |
| 7,631,935 B2 ‡ | 12/2009 | Chen | B60N 2/2851 | 297/284.9 |
| 7,651,163 B2 ‡ | 1/2010 | Jaskot | A47C 7/425 | 297/230.1 |
| 7,744,158 B2 ‡ | 6/2010 | Schurg | B64D 11/0647 | 297/391 |
| 8,898,840 B1 ‡ | 12/2014 | Majette | A47C 7/383 | 297/393 |
| 8,944,505 B2 ‡ | 2/2015 | Khalil | B60N 2/22 | 244/118.6 |
| 8,950,813 B2 ‡ | 2/2015 | Nawaz | B60N 2/806 | 297/406 |
| 8,985,622 B1 ‡ | 3/2015 | Cannon | B60R 21/231 | 280/730.2 |
| 9,611,041 B2 ‡ | 4/2017 | Baker | B60N 2/885 | |
| 10,421,381 B2 * | 9/2019 | Kuhne | B60N 2/58 | |
| 2001/0054837 A1 ‡ | 12/2001 | O'Connor | A47C 7/383 | 297/39 |
| 2002/0158499 A1 * | 10/2002 | Clough | B60N 2/885 | 297/410 |
| 2002/0185573 A1 * | 12/2002 | Bisch | A47C 7/383 | 248/118 |
| 2004/0007910 A1 * | 1/2004 | Skelly | A47C 7/38 | 297/406 |
| 2004/0195893 A1 * | 10/2004 | Clough | A47C 7/38 | 297/391 |
| 2004/0217639 A1 * | 11/2004 | Clough | A47C 7/38 | 297/391 |
| 2005/0121963 A1 * | 6/2005 | Williamson | B60N 2/01508 | 297/408 |
| 2005/0127735 A1 * | 6/2005 | Munsch | B60N 2/686 | 297/391 |
| 2006/0001307 A1 * | 1/2006 | Embach | B60R 7/043 | 297/391 |
| 2006/0131947 A1 * | 6/2006 | List | B60N 2/885 | 297/391 |
| 2007/0052264 A1 * | 3/2007 | Lee | B60N 2/26 | 297/188.04 |
| 2007/0108827 A1 * | 5/2007 | Clough | A47C 7/38 | 297/391 |
| 2007/0170759 A1 * | 7/2007 | Nolan | B60N 2/2851 | 297/250.1 |
| 2007/0188004 A1 * | 8/2007 | Browne | B60N 2/888 | 297/391 |
| 2007/0246979 A1 ‡ | 10/2007 | Browne | A47C 7/38 | 297/216.12 |
| 2007/0273194 A1 * | 11/2007 | Fraser | A47C 7/383 | 297/397 |
| 2008/0315657 A1 * | 12/2008 | Beroth | B60N 2/821 | 297/391 |
| 2009/0218874 A1 ‡ | 9/2009 | Meiller | B60N 2/885 | 297/408 |
| 2009/0236885 A1 * | 9/2009 | Maier | B60N 2/3011 | 297/257 |
| 2009/0250984 A1 * | 10/2009 | Maier | B60N 2/062 | 297/232 |
| 2009/0250985 A1 * | 10/2009 | Maier | B60N 2/206 | 297/257 |
| 2009/0302660 A1 ‡ | 12/2009 | Karlberg | B60N 2/885 | 297/40 |
| 2009/0309405 A1 ‡ | 12/2009 | Maciejczyk | B60N 2/2812 | 297/391 |
| 2010/0117430 A1 * | 5/2010 | Moeseneder | B60N 2/5816 | 297/391 |
| 2010/0295341 A1 ‡ | 11/2010 | Marsden | B60N 2/2851 | 297/216.11 |
| 2010/0295342 A1 ‡ | 11/2010 | Marsden | B60N 2/2851 | 297/216.11 |
| 2010/0295343 A1 ‡ | 11/2010 | Marsden | B60N 2/2866 | 297/216.11 |
| 2011/0012386 A1 ‡ | 1/2011 | Brncick | B60N 2/01 | 296/64 |
| 2012/0139309 A1 ‡ | 6/2012 | Gaither | B60N 2/885 | 297/220 |
| 2012/0292973 A1 * | 11/2012 | Westerink | B60N 2/80 | 297/391 |
| 2013/0113267 A1 * | 5/2013 | Davis | B60R 22/001 | 297/464 |
| 2013/0193712 A1 * | 8/2013 | Marcus | B60J 3/0204 | 296/97.3 |
| 2013/0221722 A1 * | 8/2013 | Navarro | B60N 2/885 | 297/391 |
| 2014/0117731 A1 ‡ | 5/2014 | Asli | B65D 11/06 | 299/284.9 |
| 2014/0300168 A1 ‡ | 10/2014 | Szczygiel | B60N 2/885 | 297/391 |
| 2015/0061340 A1 ‡ | 3/2015 | Fleming | B60R 22/001 | 297/391 |
| 2015/0102644 A1 * | 4/2015 | Rajasingham | B60N 2/2884 | 297/216.11 |
| 2016/0214513 A1 * | 7/2016 | Millan | B60N 2/838 | |
| 2018/0056833 A1 ‡ | 3/2018 | Kuhne | B60N 2/885 | |

OTHER PUBLICATIONS

Japan Patent Application No. 2017-550664, Office Action, dated Jun. 25, 2019.
U.S. Appl. No. 15/561,994, Non-Final Rejection dated Feb. 4, 2019.
U.S. Appl. No. 15/561,994, Notice of Allowance dated May 15, 2019.

\* cited by examiner
‡ imported from a related application

ADJUSTABLE HEADREST ENABLING SIDEWARD LEANING AND SECLUSION

REFERENCE TO RELATED APPLICATION

This application is a continuation of U.S. Nonprovisional Patent Application Ser. No. 15/561,994, filed Sep. 27, 2017 and entitled ADJUSTABLE HEADREST ENABLING SIDEWARD LEANING AND SECLUSION, which application is the U.S. national stage entry of International Patent Application No. PCT/US2016/025207, filed on Mar. 31, 2016, which application claims the benefit of U.S. Provisional Patent Application No. 62/140,490, filed on Mar. 31, 2015 and entitled ADJUSTABLE HEADREST ENABLING SIDEWARD LEANING AND SECLUSION, all of which are hereby incorporated in their entireties by this reference.

BACKGROUND

Field

This application relates to passenger seats, and more particularly to headrests of an improved type.

Background Technology

Passenger vehicles, such as aircraft, buses, trains, ships, and automobiles, include passenger seats for passengers to sit in and utilize during travel. Passenger seats, such as passenger aircraft seats, are typically provided with a headrest that both provides a passenger with both protection by limiting rearward movement of the passenger's head and comfort by providing a place for the passenger to rest his or her head. However, common headrests insufficiently support the passenger's head, are not controllable by the passenger, and provide little privacy for the passenger.

For example, some adjustable headrests have side wings that fold towards the head in the upright position. However, the side head support currently offered in adjustable headrests does not suffice because the side wings are not dimensioned in such a way that it prevents the head from slipping away while leaning side ward, nor is the shape based on the varying shapes and dimensions of the head. While other adjustable headrests include one or two side wings of a bigger size to enable leaning, a passenger cannot choose to store away these side wings if they wish not to use them, for example if he or she wants to interact with other passengers As another example, previous attempts have been made to increase the perception of privacy, for example by providing a privacy screen between seats that passengers could let go up. Due to space limitations in the plane, however, these solutions are not widely implemented in economy class cabins and moreover, the gesture of letting up a screen can further impede the yet delicate interaction between two passengers that do not know each other.

As a result, there is still a need for a headrest that caters to the support, privacy, and control aspects of passenger seats all at once.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat headrest comprises a body comprising a forward side, an aft side distal from the forward side, a first side extending between the forward side and the aft side, and a second side distal from the first side and extending between the forward side and the aft side. The passenger seat headrest also comprises a side wing pivotably connected to the first side of the body. In some embodiments, the side wing is pivotable between a stowed position, at which the side wing is positioned against the forward side of the body, and a deployed position, at which the side wing is spaced apart from the forward side of the body.

In certain embodiments, the side wing is a first side wing, and the passenger seat headrest further comprises a second side wing pivotably connected to the second side of the body. In various embodiments, the second side wing is pivotable between a stowed position, at which the second side wing is positioned against the forward side of the body, and a deployed position, at which the second side wing is spaced apart from the forward side of the body. In some embodiments, an inner surface of the first side wing faces an inner surface of the second side wing when the first side wing and the second side wing are in the respective deployed positions. In some cases, the second side wing is pivotable independent from the first side wing.

In various embodiments, the forward side of the body comprises a forward-facing surface, the side wing comprises an inner surface and an outer surface, the forward side of the body defines a first wing recess having a wing recess surface, and in the stowed position, the inner surface of the side wing is positioned against the wing recess surface and the outer surface of the side wing is flush with the forward-facing surface of the body. In certain embodiments, in the deployed position, the side wing is substantially perpendicular to the forward side of the body.

In various embodiments the passenger seat headrest further comprises: a dress cover secured to the body and the side wing and covering at least a portion of the forward side of the body and at least a portion of the side wing. The dress cover defines a hammock portion.

In some embodiments, the side wing comprises: a first side edge positioned proximate to the body; a second side edge distal from the first side edge; and an inner surface extending from the first side edge to the second side edge. The hammock portion can be secured to the front side of the body at a position about halfway between the first side of the body and the second side of the body, and the hammock portion can be secured to the inner surface of the side wing proximate to the second side edge.

According to certain embodiments of the present invention, a passenger seat headrest comprises: a body comprising a forward side, an aft side distal from the forward side, a first side extending between the forward side and the aft side, and a second side distal from the first side and extending between the forward side and the aft side; a side wing pivotably connected to the first side of the body; and a dress cover covering at least a portion of the body. The dress cover can define a hammock portion connected to the body and to the first side wing.

In some embodiments, the side wing is pivotable between a stowed position and a deployed position, wherein in the stowed position the side wing is positioned against the forward side of the body, and wherein in the deployed position the side wing is spaced apart from the forward side of the body. In various embodiments, the hammock portion of the dress cover is in a relaxed position when the side wing is in the stowed position and in a tensioned position when the side wing is in the deployed position. In certain embodiments, in the relaxed position the hammock portion is folded between the side wing and the body, and in the tensioned position a surface of the hammock portion defines a resting area between the side wing and the body.

In various embodiments, the dress cover is constructed from leather. In some embodiments, the hammock portion is a first hammock portion, the side wing is a first side wing, and the passenger seat headrest further comprises: a second side wing pivotably connected to the second side of the body. In these embodiments, the dress cover can define a second hammock portion connected to the second side wing and the body. In some embodiments, the first side wing comprises: a first side edge positioned proximate to the body; a second side edge distal from the first side edge; and an inner surface extending from the first side edge to the second side edge. The first hammock portion can be secured to the front side of the body at a position about halfway between the first side of the body and the second side of the body, and the first hammock portion can be secured to the inner surface of the first side wing proximate to the second side edge. In some embodiments, the second side wing comprises: a first side edge positioned proximate to the body; a second side edge distal from the first side edge; and an inner surface extending from the first side edge to the second side edge, wherein the second hammock portion can be secured to the front side of the body at a position about halfway between the first side of the body and the second side of the body, and wherein the second hammock portion can be secured to the inner surface of the first side wing proximate to the second side edge.

According to certain embodiments of the present invention, a passenger seat headrest can comprise: a body; a side wing connected the body and pivotable between a deployed position and a stowed position; and a dress cover comprising a hammock portion connected to the body and to the side wing. The hammock portion can be movable between a relaxed position and a tensioned position, wherein in the relaxed position the hammock portion is folded between the side wing and the body, and wherein in the tensioned position a surface of the hammock portion defines a resting area between the side wing and the body.

In some embodiments, the side wing is a first side wing, and the passenger seat headrest further comprises: a second side wing connected to the body at a location distal from the first side wing. The second side wing can be pivotable between a deployed position and a stowed position and can be pivotable independent from the first side wing.

In various embodiments, the hammock portion is a first hammock portion, and the dress cover further comprises: a second hammock portion connected to the body and to the second side wing. The second hammock portion can be movable independent from the first hammock portion and can be movable between a relaxed position and a tensioned position. In the relaxed position, the second hammock portion is folded between the second side wing and the body, and in the tensioned position, a surface of the second hammock portion defines a resting area between the second side wing and the body.

In some embodiments, the side wing is connected to the body through a torque hinge, and wherein the torque hinge comprises a detent. In certain embodiments, the body comprises a forward side defining a forward-facing surface and a wing recess surface, the side wing comprises an inner surface and an outer surface, and in the stowed position, the inner surface of the side wing is positioned against the wing recess surface and the outer surface of the side wing is flush with the forward-facing surface of the body.

Various implementations described in the present disclosure can include additional systems, methods, features, and advantages, which can not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
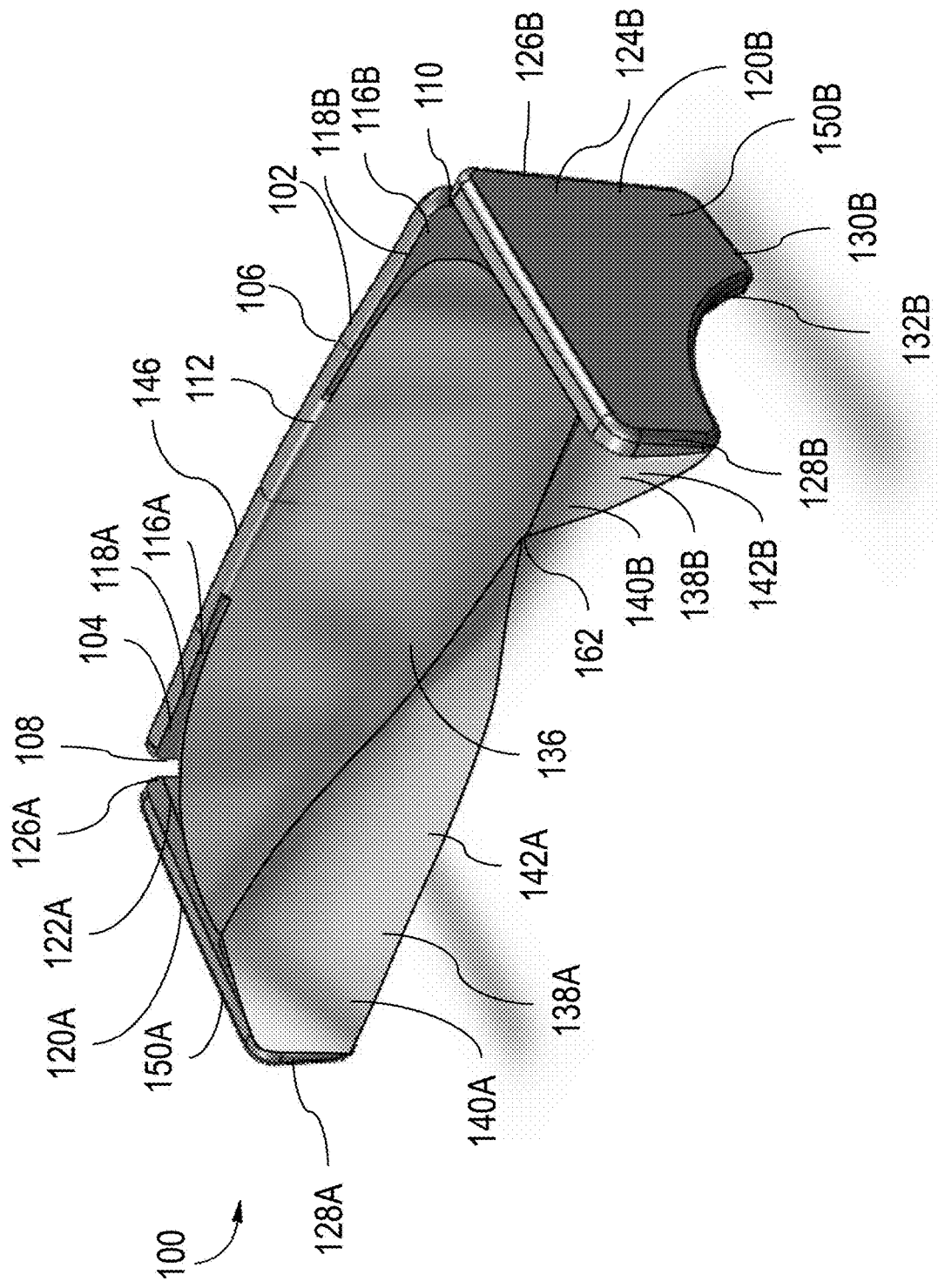
FIG. 1 is a perspective view of a passenger seat headrest in accordance with one embodiment of the current disclosure, the passenger seat headrest including a body, side wings, and a dress cover.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide seat assemblies tray table assemblies for use with passenger seats. While the adjustable support assemblies are discussed for use with aircraft seats, they are by no means so limited. Rather, embodiments of the adjustable support assemblies may be used in passenger seats or other seats of any type or otherwise as desired. Directional references such as "forward," "aft," "up," "down," "top," "left," "right," "front," "back," and "corners," among others are intended to refer to the orientation as illustrated and described in the figure (or figures) to which the components and directions are referencing.

In one aspect, disclosed is a passenger seat headrest and associated methods, systems, devices, and various apparatus. The passenger seat headrest can comprise an body and a side wing. The passenger seat headrest can also comprise a dress cover. It would be understood by one of skill in the art that the disclosed passenger seat headrest is described in but a few exemplary aspects among many.

In one aspect, an adjustable headrest enabling sideward leaning and seclusion is disclosed. In one embodiment, the passenger seat headrest has side wings that pivot at the far ends of the seat, so as to enable sideward leaning without having to keep the head facing straight forward. In another embodiment, the passenger seat headrest relocates the pivoting points of the side wings to enable bigger side wings to be deployed. The deployed side wings reveal a hammock construction which is tensioned by deploying the side wing, as such creating a surface of the passenger to rest his head, following the form of the head to a certain extent. The hammock construction is designed to cradle the side of the head and cheek, as to prevent the head from slipping away while sleeping and reducing neck strain. In some embodiments, the passengers can control the use of both or either one of the side wings. The side wings can be stowed during takeoff and landing, which may not hamper cabin crew procedures according to some embodiments.

In various embodiments, the passenger seat head rest is adjustable. In some embodiments, a designed consequence of deploying the side wings is that visual shielding is provided at eye level of the passenger. The side wings are shaped in such a way that a passenger is not completely shut off from his neighbor, and can still see what is happening around him at an up and downward angle. In some embodiments, the hammock construction is incorporated in the dress cover. In other embodiments, the hammock material may be designed to repel facial grease because it is configured to be more in contact with the face of the passenger compared to conventional dress covers.

In some embodiments, the headrest comprises a body with a side wing on each side, pivoting at the ends of the body. The side wings can be a designed to be either used in a stowed configuration (required during take-off and landing of the aircraft), where the side wings are folded inwards and flat against the back structure of the seat, or in the deployed position (for providing side support and privacy during the flight), in which case they are deployed to form side wings positioned perpendicular to the seat structure. These wings can be operated manually and each side can be deployed or stowed separately to the liking of the passenger.

In various embodiments, the body includes a back plate and each side wing includes a side plate. In some embodiments, the plates are metal, although they need not be. The side plates can be connected by torque hinges to keep the side wings in the deployed or stowed configuration. The back plate can include holes for the attachment of a height adjustment mechanism to be attached to a chair. Cushioning, such as foam cushioning, can be attached to the three plates and shaped in such a way that a gradual transition between the portion supporting the back of the head and the more protruding neck portion is provided in both stowed and deployed configuration. A dress cover can cover the plates and foam cushioning and includes the hammock construction, which folds flat when the side wings are stowed.

The shape of the hammock construction and side wing can be designed based on anthropometric dimensions of the passenger's head. It will be appreciated that the shape and design of the cushioning should not be considered limiting on the current disclosure. As one non-limiting example, the cushioning may be designed to include a more gradual transition between the side flaps and the back padding in the stowed position, a more distinctly protruding neck bump along the entire width of the headrest (including the side wings) and a different shape of the ends of the side wings to provide more room and sturdiness for the attachment of the hammock construction.

It will further be appreciated that the material used to construct the dress cover should not be considered limiting on the current disclosure. As one non-limiting example, imitation leather may be used to construct the dress cover. Other material may be utilized to construct the dress cover suitable for folding, operating conditions or load requirements of the headrest.

In some embodiments, the torque hinges may include a detent to limit the movement of the side wings to 90 degrees, such as to prevent excessive force on the hammock construction. The height adjustment mechanism, outer dimensions and shape of the headrest may be altered to suit different seat models. The disclosed headrest provides head support and visual privacy through the pivoting side wings revealing a hammock construction, thereby enabling sideward leaning and seclusion.

Figure 2:
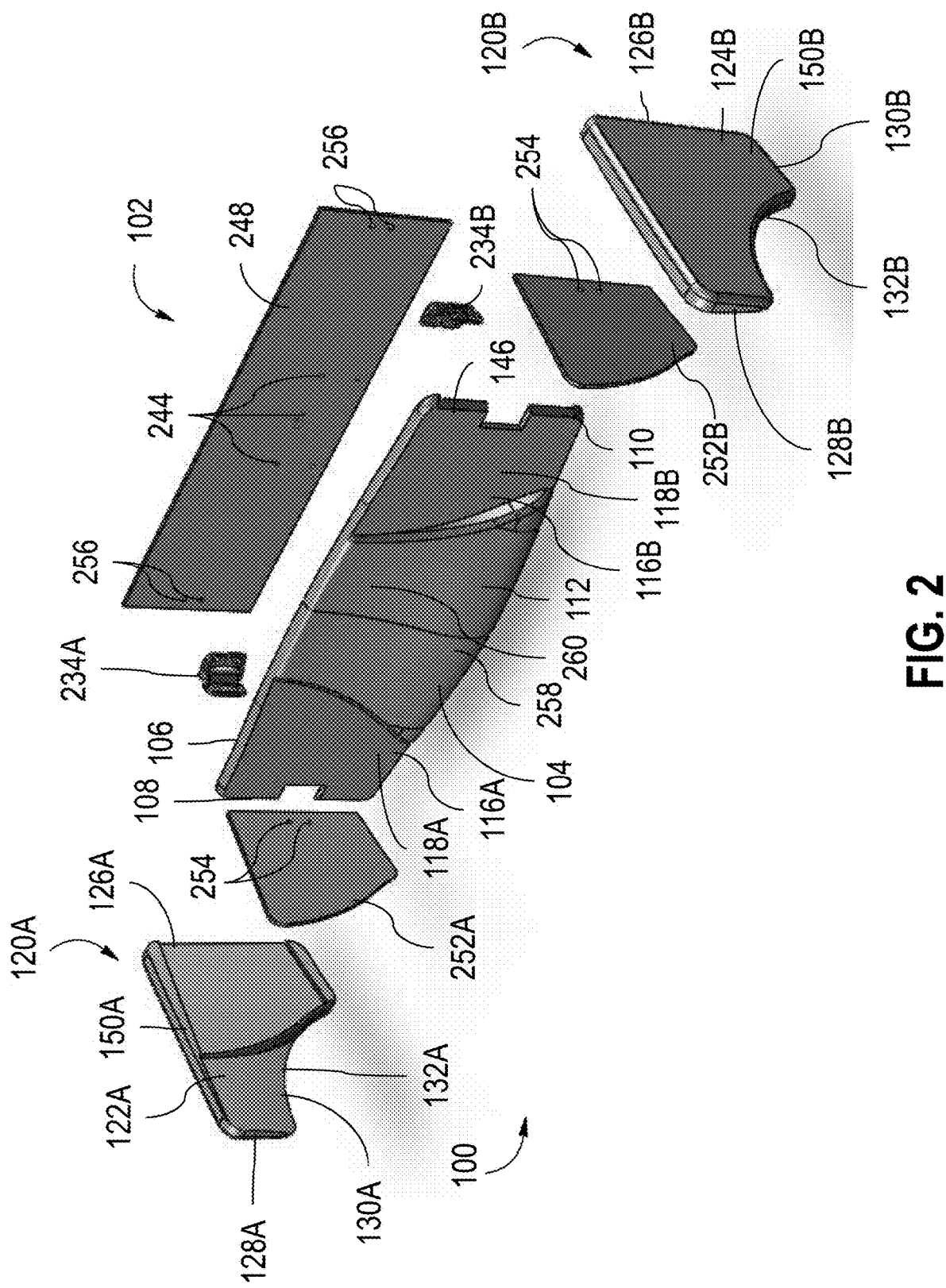
FIG. 2 is an exploded assembly view of the passenger seat headrest of FIG. 1 without the dress cover.
Figure 3:
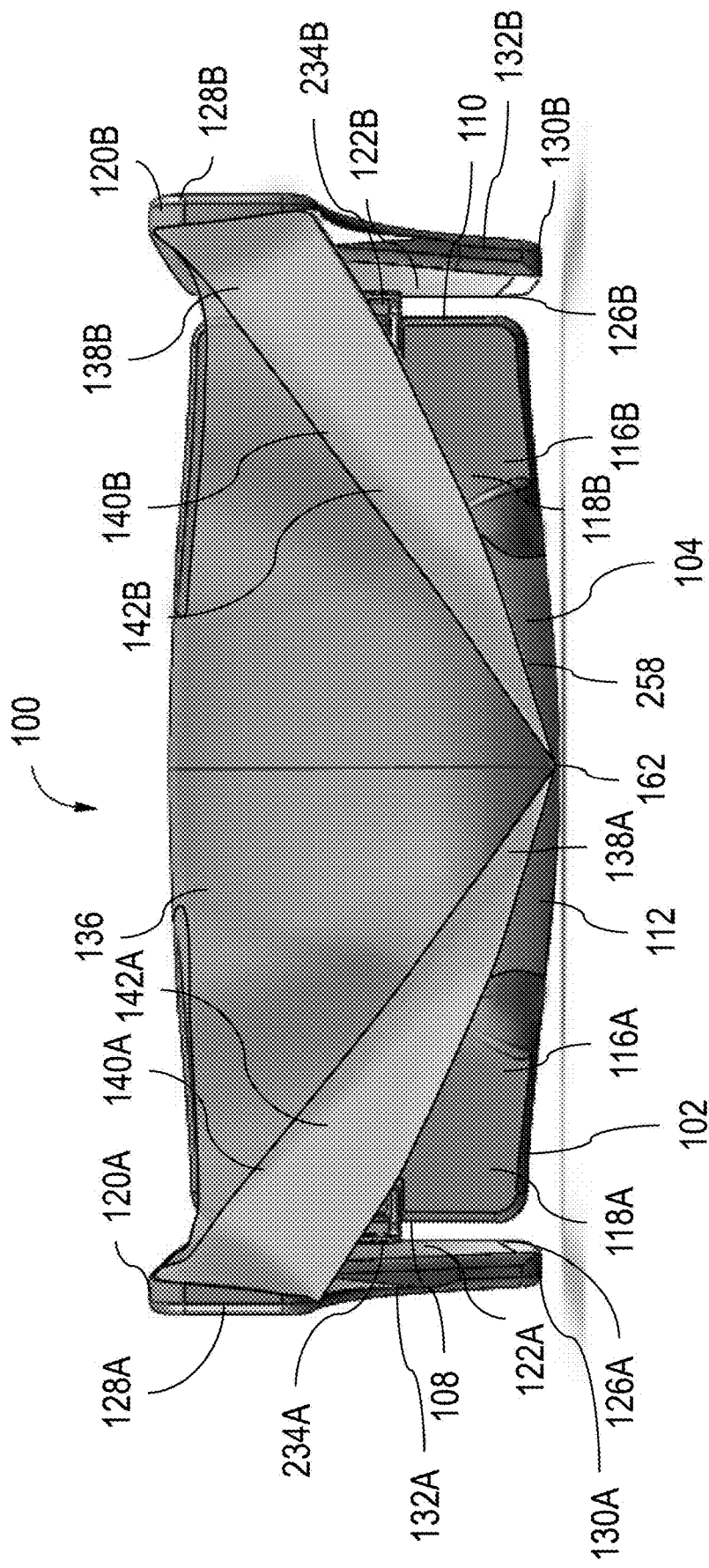
FIG. 3 is a front view of the passenger seat headrest of FIG. 1 with the side wings in deployed positions.
Figure 4:
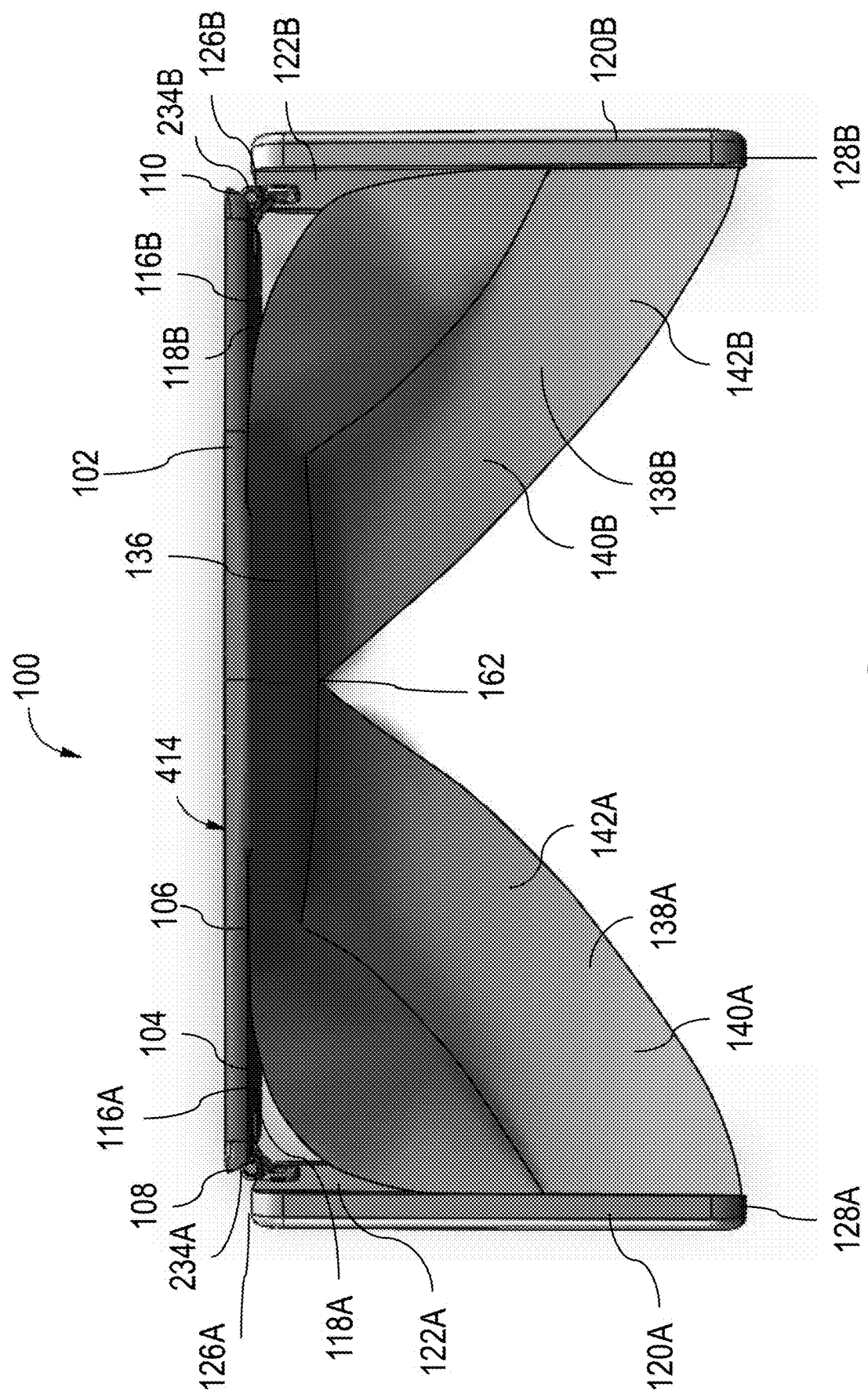
FIG. 4 is a top view of the passenger seat headrest of FIG. 1 with the side wings in the deployed positions.
Figure 5:
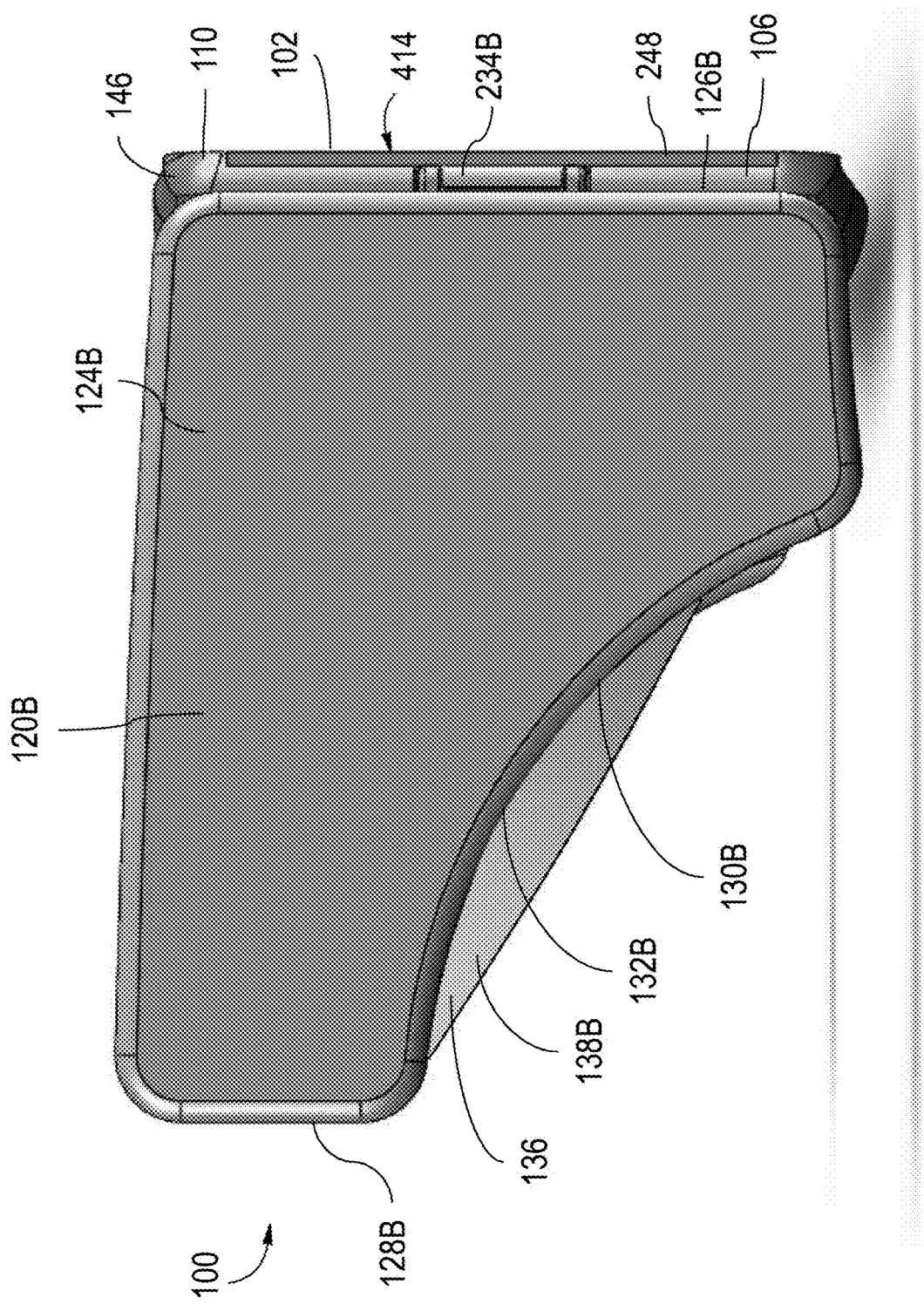
FIG. 5 is a side view of the passenger seat headrest of FIG. 1 with the side wings in the deployed positions.

Referring to FIGS. 1-10, a passenger seat headrest 100 can comprise a body 102. As illustrated in FIG. 2, in some embodiments, the body 102 can comprise a cushion 146 secured to a back plate 248. It is contemplated that the cushion 146 can be secured to the back plate 248 through various securing mechanisms including, but not limited to, glues, adhesives, hook and loop fasteners, snaps, clips, clasps, screws, nuts and bolts, and various other securing mechanisms. In some embodiments, the cushion 146 is constructed from a cushioning material and the back plate 248 is constructed from metal. However, the materials used to construct the cushion 146 and back plate 248 should not be considered limiting on the current disclosure as it is contemplated that various other materials including, but not limited to various composites, foams, metals, woods, plastics, or various other materials can be utilized. It will be appreciated that the shape of the cushion 146 and back plate 248 should not be considered limiting on the current disclosure as it is contemplated that the body 102 can have any desired shape. In some embodiments, as illustrated in FIG. 2, the back plate 248 can define a plurality of attachment holes 244. The attachment holes 244 can be utilized to attach a height attachment mechanism that can optionally attach the headrest 100 to a passenger seat (not illustrated).

The body 102 comprises a forward side 104, an aft side 106 distal from the forward side 104, a first side edge 108 extending between the forward side 104 and the aft side 106, and a second side edge 110 distal from the first side edge 108 and extending between the forward side 104 and the aft side 106. The forward side 104 includes a forward-facing surface 112 and the aft side includes an aft-facing surface 414 (illustrated in FIG. 4). In some embodiments, the forward side 104 defines side wing recesses 116A, B. Each side wing recess 116A, B includes a wing recess surface 118A, B, respectively. In some embodiments, the wing recess surfaces 118A, B are defined in the body 102 such that the forward-facing surface 112 is the forward-most surface of the body 102. As described in greater detail below, the side wing recesses 116A, B are designed to accommodate side wings 120A, B in various embodiments.

In some embodiments, the forward-facing surface 112 can extend from the first side edge 108 to the second side edge 110, although it need not. In some embodiments, as illustrated in FIG. 2, the forward-facing surface 112 can define a neck portion 258 and a head portion 260. In various embodiments, the neck portion 258 extends in a forward direction from the body 102 relative to the head portion 260. It is contemplated that in some embodiments, the neck portion 258 can extend from the first side edge 108 to the second side edge 110, although it need not.

The passenger seat headrest 100 can comprise the side wings 120A, B. Similar to the body 102, in various embodiments, each side wing 120A, B can comprise a cushion 150A, B secured to a side plate 252A, B (illustrated in FIG. 2). Similar to the body 102, it is contemplated that the cushions 150A, B can be secured to the side plates 252A, B, respectively, through various securing mechanisms including, but not limited to, glues, adhesives, hook and loop fasteners, snaps, clips, clasps, screws, nuts and bolts, and various other securing mechanisms. In some embodiments, the cushions 150A, B are constructed from a cushioning material and the side plates 252A, B are constructed from metal. However, the materials used to construct the cushions 150A, B and side plates 252A, B should not be considered limiting on the current disclosure as it is contemplated that various other materials including, but not limited to various composites, foams, metals, woods, plastics, or various other materials can be utilized. It will be appreciated that the shape of the cushions 150A, B and side plates 252A, B should not be considered limiting on the current disclosure as it is contemplated that the side wings 120A, B can have any desired shape.

Each side wing 120A, B respectively comprises an inner surface 122A, B (inner surface 122B illustrated in FIG. 3), an outer surface 124A, B (outer surface 124A illustrated in FIG. 6), a first side edge 126A, B extending between the inner surface 122A, B and the outer surface 124A, B, respectively, and a second side edge 128A, B distal from the first side edge 126A, B and extending between the inner surface 122A, B and the outer surface 124A, B, respectively. In some embodiments, each side wing 120A, B respectively comprises a bottom edge 130A, B (bottom edge 130A illustrated in FIG. 2) extending from the first side edge 126A, B to the second side edge 128A, B. Each bottom edge 130A, B can comprise a privacy portion 132A, B (privacy portion 132A illustrated in FIG. 2) in various embodiments. In some embodiments, the privacy portions 132A, B can be included such that the side wings 120A, B can provide some privacy to a passenger by providing some visual shielding or blocking at eye level while allowing the passenger to still see what is happening around him or her at an upward or downward angle.

In some embodiments, the side wing 120A is connected to the first side edge 108 of the body 102. In various embodiments, the side wing 120A is connected to the first side edge 108 such that the first side edge 126A is positioned proximate to the first side edge 108 of the body 102. In a similar manner, in some embodiments, the side wing 120B is connected to the second side edge 110 of the body 102. In various embodiments, the side wing 120B is connected to the second side edge 110 such that the first side edge 126A is positioned proximate to the first side edge 108.

In certain cases, the side wings 120A, B are each pivotably connected to the body 102 such that the side wings 120A, B are movable between stowed positions and deployed positions, respectively. In some embodiments, the side wings 120A, B are pivotably connected through hinges 234A, B (illustrated in FIG. 2), respectively, although it is contemplated that various other movement mechanisms can be utilized. In some embodiments, as illustrated in FIG. 2, the side plates 252A, B can define securing holes 254 and the back plate 248 can define securing holes 256 such that the hinges 234A, B can be secured to the side plates 252A, B and back plate 248. In various embodiments, the hinges 234A, B can be torque hinges such that the side wings 120A, B can be held in place at the deployed position, the stowed position, or positions between the deployed and stowed positions. In some examples, the hinges 234A, B can comprise detents (not illustrated) to limit the movement of the side wings 120A, B, respectively. In some embodiments, the detents can be utilized to prevent excessive force on hammock portions 138A, B of a dress cover 136, which are described in greater detail below. In various embodiments, the side wing 120A is independently movable relative to the side wing 120B such that the passenger can deploy or stow the side wings 120A, B separately as desired.

Figure 6:
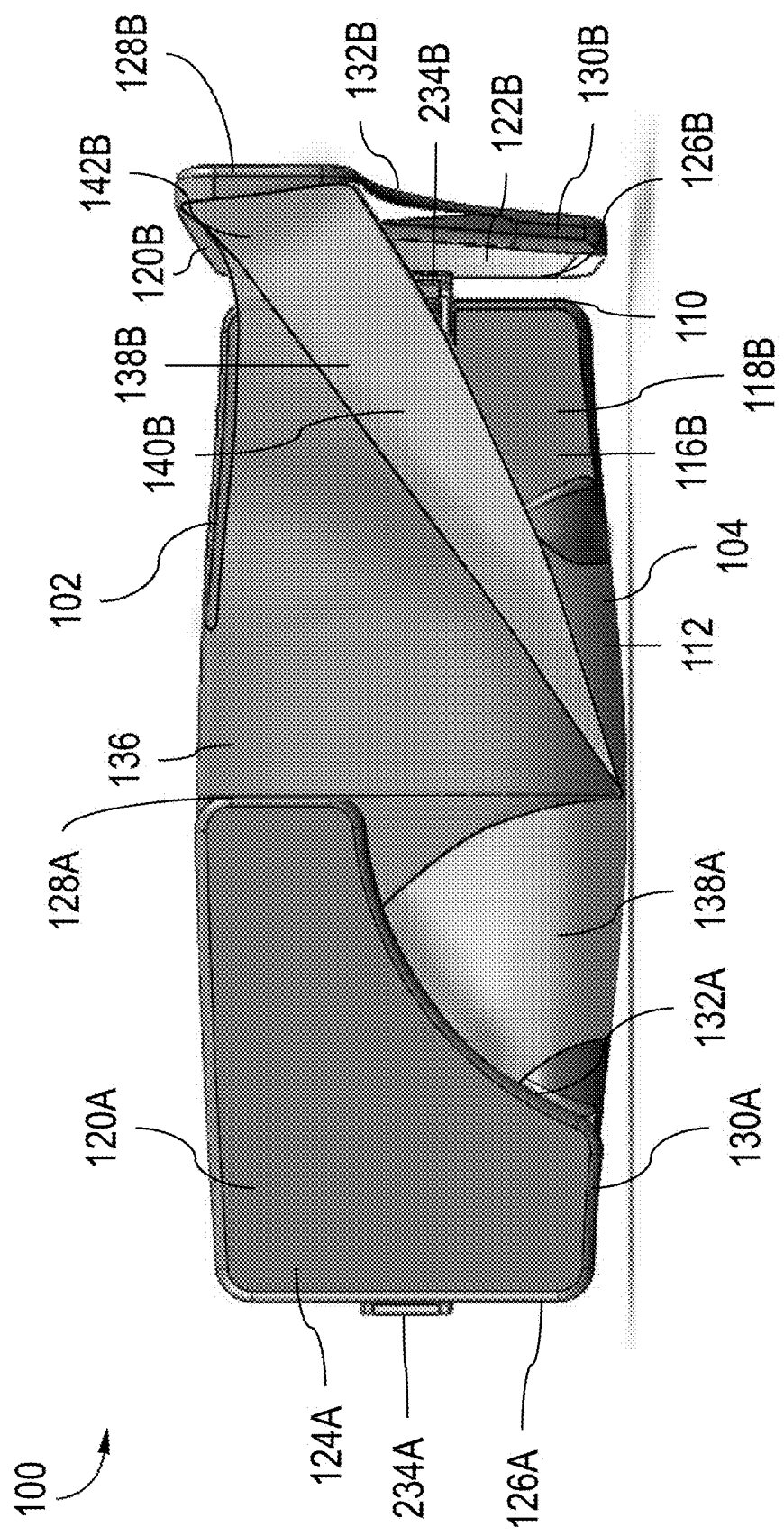
FIG. 6 is a front view of the passenger seat headrest of FIG. 1 with one side wing in a deployed position and another side wing in the stowed position.
Figure 7:
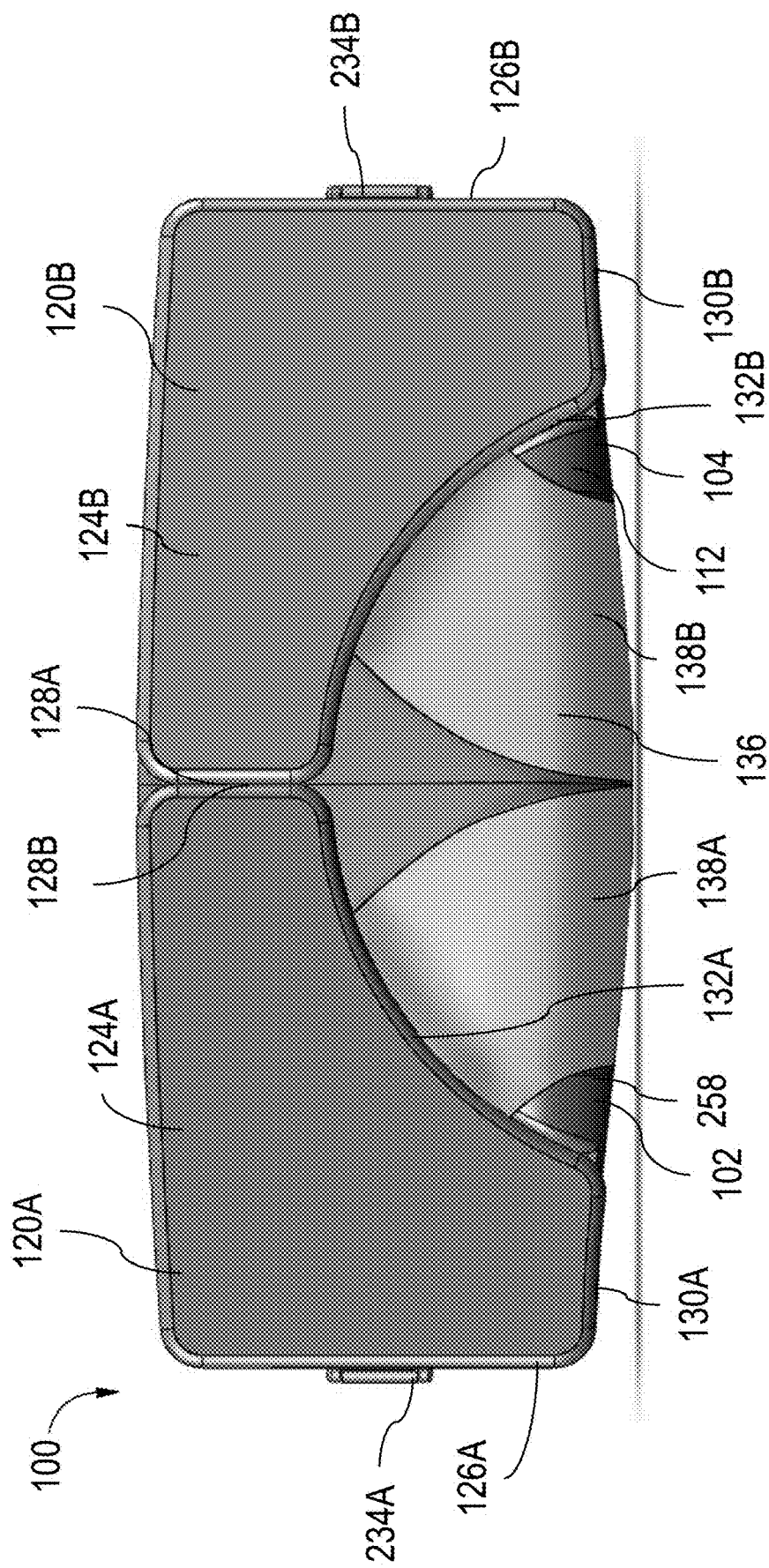
FIG. 7 is a front view of the passenger seat headrest of FIG. 1 with the side wings of in the stowed positions.
Figure 8:
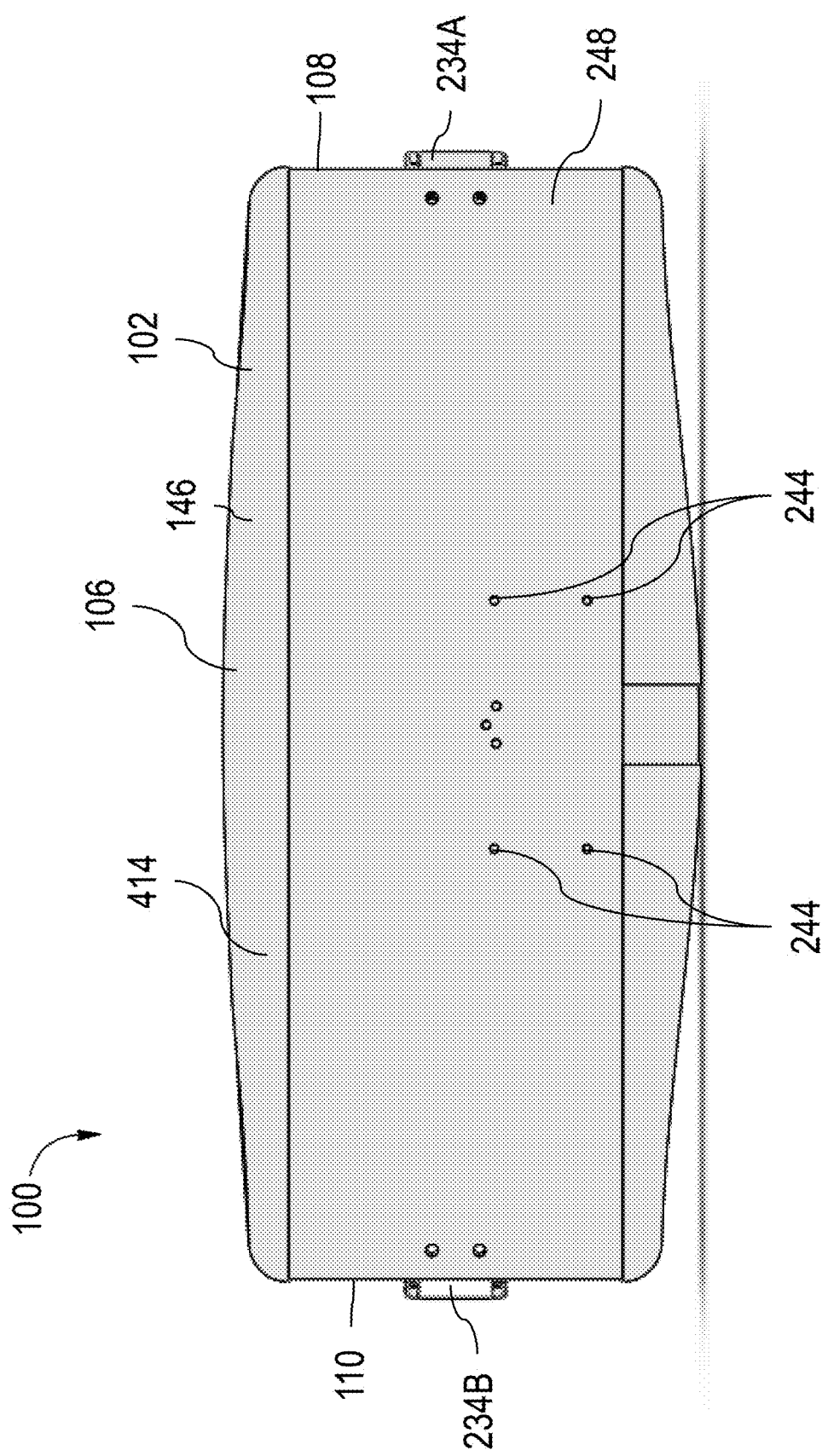
FIG. 8 is a back view of the passenger seat headrest of FIG. 1 with the side wings in the stowed positions.
Figure 9:
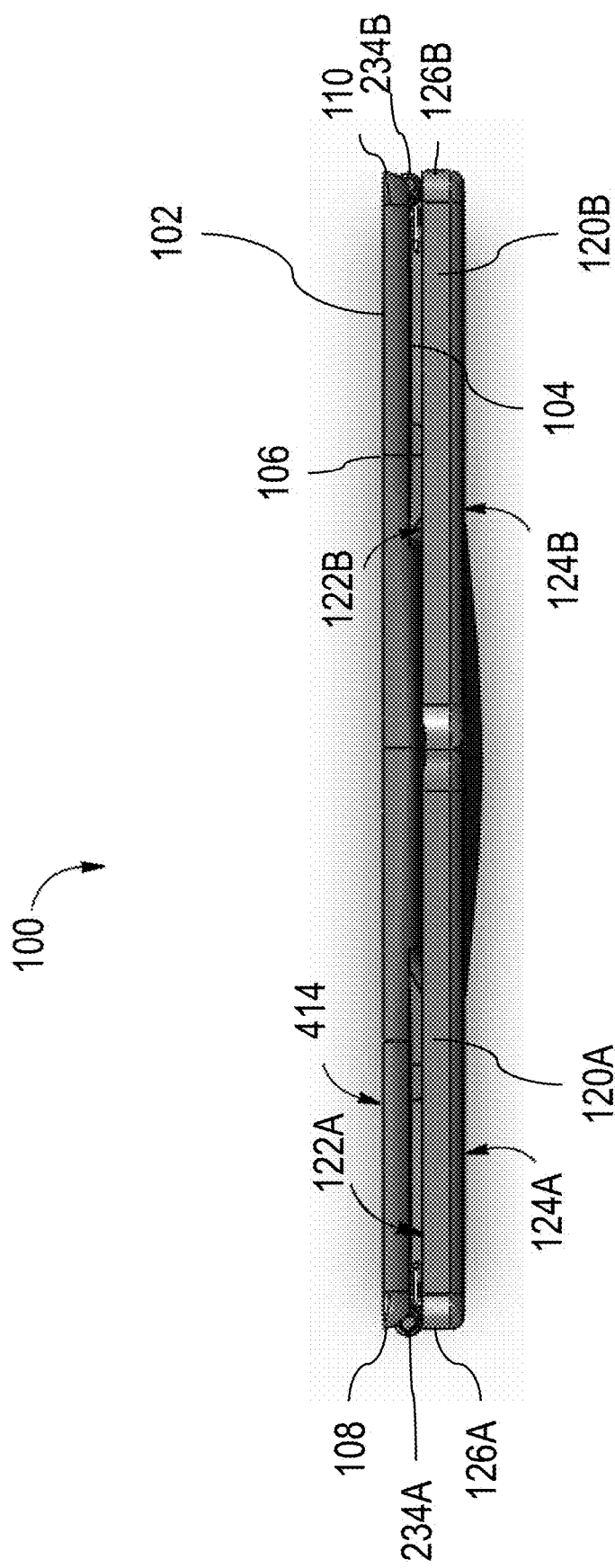
FIG. 9 is top view of the passenger seat headrest of FIG. 1 with the side wings in the stowed positions.
Figure 10:
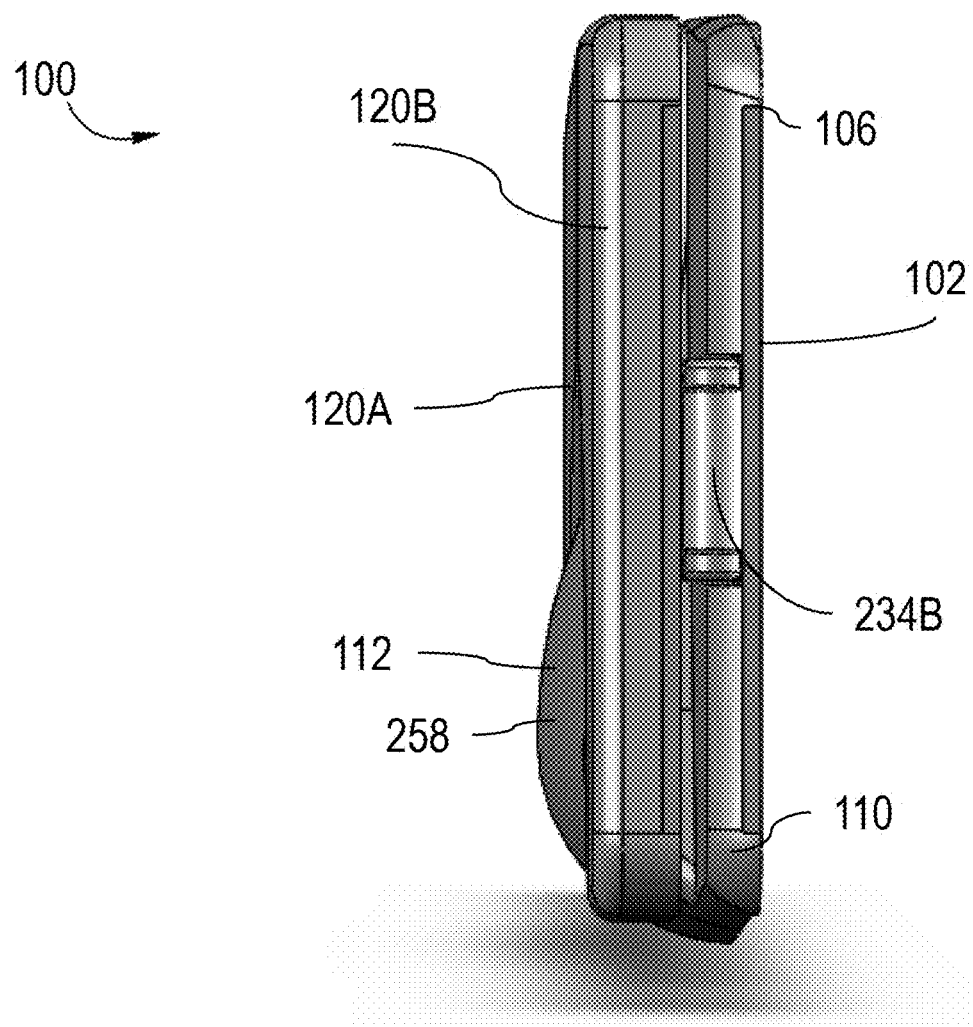
FIG. 10 is a side view of the passenger seat headrest of FIG. 1 with the side wings in the stowed positions.

FIGS. 1 and 3-5 illustrate both side wings 120A, B in the deployed positions. FIG. 6 illustrates side wing 120A in the stowed position while side wing 120B is in the deployed position. FIGS. 7-10 illustrate both side wings 120A, B in the stowed positions.

In the stowed position, the side wings 120A, B are positioned such that they are proximate to the body 102. As one non-limiting example, in some embodiments, the side wings 120A, B are positioned against the forward side 104 of the body 102. As another non-limiting example, in some embodiments, in the stowed position, the inner surfaces 122A, B face and/or contact the forward side 104 of the body 102. In a further non-limiting example, in the stowed position, the inner surfaces 122A, B face and/or contact the wing recess surfaces 118A, B, respectively. In some embodiments, in the stowed position, the outer surfaces 124A, B can be flush with the forward-facing surface 112.

In the deployed position, the side wings 120A, B are positioned such that they are spaced apart from the body 102. As illustrated in FIG. 1, in some embodiments, in the deployed position, the second side edges 128A, B of the side wings 120A, B, respectively, are spaced apart from the forward side 104 of the body 102. As a non-limiting example, in some embodiments, in the deployed position, the side wings 120A, B can be substantially perpendicular to the body 102. For example, the side wings 120A, B can be substantially perpendicular to the forward side 104 in some embodiments. In some embodiments, when both side wings 120A, B are in their respective deployed positions, the inner surface 122A of the side wing 120A can face the inner surface 122B of the side wing 120B.

It is contemplated that in some non-limiting examples, the passenger may move the side wings 120A, B to the stowed position during take-off and/or landing of an aircraft and the passenger may move one or both side wings 120A, B to the deployed position during flight time on the aircraft to provide side support and privacy.

In some embodiments, the passenger seat headrest 100 can comprise the dress cover 136. Optionally, in some embodiments, the dress cover 136 can be constructed from a material that can repel facial oils as the dress cover 136 can be designed to be in more contact with the passenger's face. As one non-limiting example, it is contemplated that the dress cover 136 can be constructed from leather. However, other materials suitable for folding, operating conditions, and load requirements of the headrest 100 as described below can also be used.

The dress cover 136 covers at least a portion of the body 102 in various embodiments. For example, in some embodiments, the dress cover 136 covers at least a portion of the forward side 104, such as at least a portion of the forward-facing surface 112 and/or at least a portion of the wing recess surface 118A and/or at least a portion of the wing recess surface 118B. In various embodiments, the dress cover 136 is connected to the body 102 and at least one of the side wings 120A, B. In the present example, the dress cover 136 is connected to both side wings 120A, B. In some embodiments, the dress cover 136 covers at least a portion of the inner surface 122A, B of the side wings 120A, B, respectively.

As illustrated in FIG. 1, in some embodiments, the dress cover 136 defines the hammock portions 138A, B. In some embodiments, the hammock portions 138A, B are integrally formed with the dress cover 136; however, it is contemplated that in various other embodiments, the hammock portions 138A, B can be separate components attached or otherwise secured to the dress cover 136. The hammock portions 138A, B each include a hammock portion surface 140A, B, respectively. In various embodiments, the hammock portions 138A, B are shaped based on anthropometric dimensions. In some embodiments, the hammock portions 138A, B are shaped and designed such that the hammock portions 138A, B can cradle the side of the head and/or cheek of the passenger to as to retain the head while sleeping. In some cases, the hammock portions 138A, B can reduce neck strain by supporting the head. It will be appreciated that the number of hammock portions 138 should not be considered limiting on the current disclosure.

In various embodiments, the hammock portion 138A is connected to the side wing 120A and the body 102 and the hammock portion 138B is connected to the side wing 120B and the body 102. In various embodiments, the hammock portions 138A, B can be connected to the inner surfaces 122A, B of the side wings 120A, B, respectively. In some embodiments, the hammock portion 138A is connected proximate to the second side edge 128A of the side wing 120A. Similarly, the hammock portion 138B can be connected proximate to the second side edge 128B of the side wing 120B. In various embodiments, the hammock portions 138A, B are connected to the body 102 at a position between the first side edge 108 and the second side edge 110. In some embodiments, the hammock portions 138A, B are connected to the forward side 104 of the body at a position 162 about halfway between the first side edge 108 and the second side edge 110, although it need not be.

The hammock portions 138A, B are movable between a relaxed position and a tensioned position, respectively. FIGS. 1 and 3-5 illustrate both hammock portions 138A, B in the tensioned positions. FIG. 6 illustrates hammock portion 138A in the relaxed position and hammock portion 138B in the tensioned position. FIGS. 7-10 illustrate both hammock portions 138A, B in the relaxed positions.

In some embodiments, the hammock portions 138A, B are in the relaxed positions when the side wings 120A, B are in the stowed positions, respectively. In some embodiments, in the relaxed positions, the hammock portions 138A, B can be folded flat. In various embodiments, the hammock portions 138A, B can be positioned between the side wings 120A, B and the body 102, respectively. In various embodiments, the hammock portions 138A, B are in the tensioned positions when the side wings 120A, B are in the deployed positions, respectively. As illustrated in FIG. 1, in the tensioned positions, the hammock portion surfaces 140A, B define resting areas 142A, B between the side wings 120A, B and the body 102, respectively. While at least one of the hammock portions, such as hammock portion 138A, is in the tensioned position, the passenger can rest his or her head on the hammock portion surface 140A.

Figure 11:
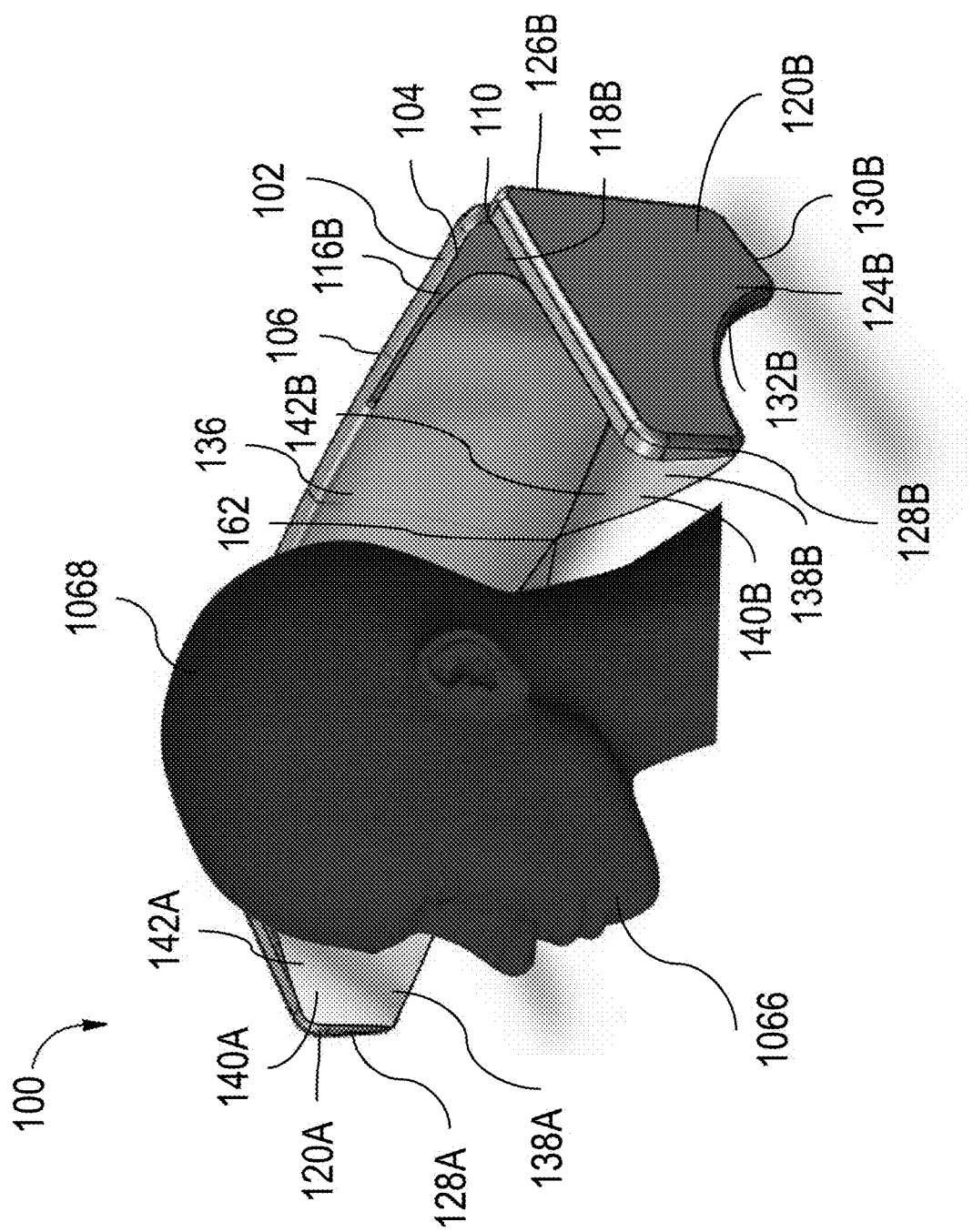
FIG. 11 is a perspective view of the passenger seat headrest of FIG. 1 supporting a passenger's head.
Figure 12:
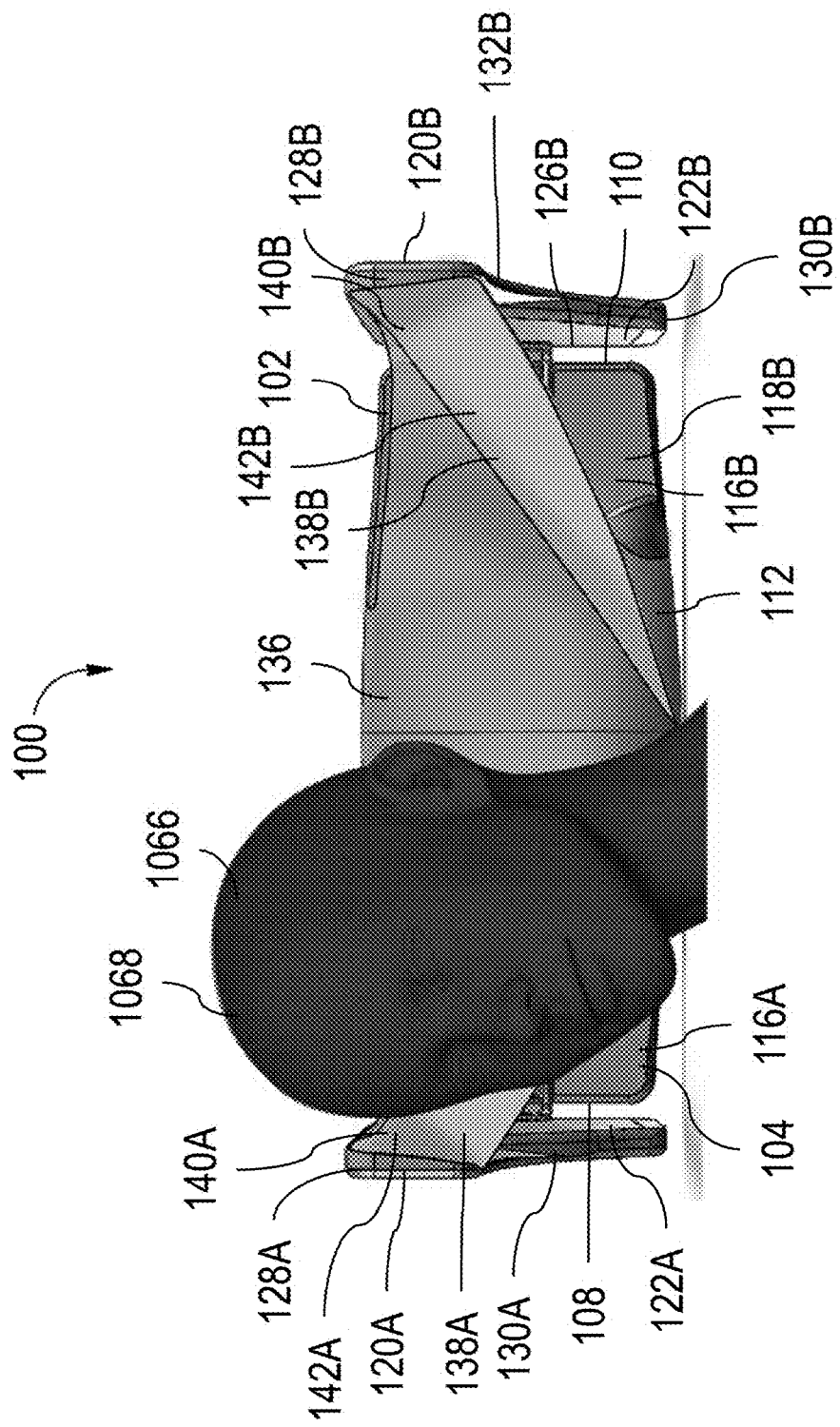
FIG. 12 is a front view of the passenger seat headrest of FIG. 1 supporting a passenger's head.
Figure 13:
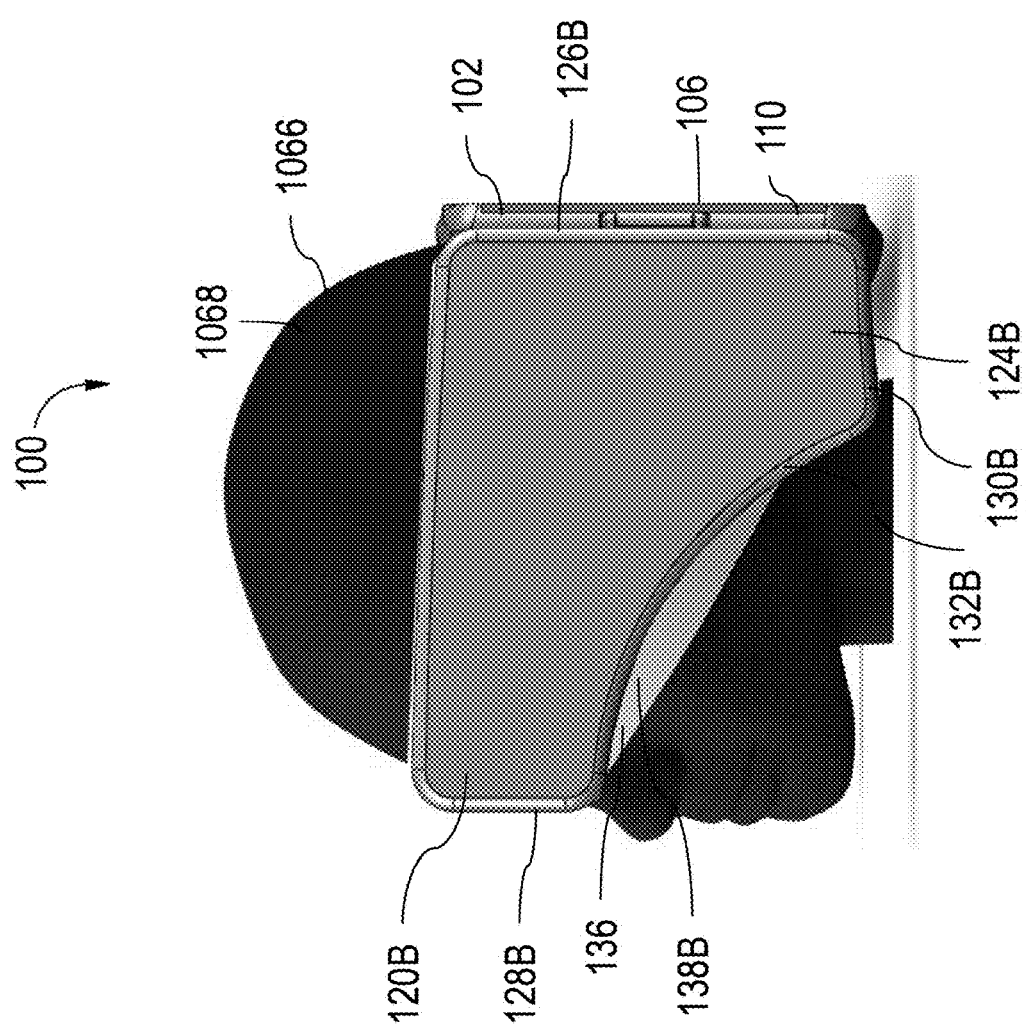
FIG. 13 is a side view of the passenger seat headrest of FIG. 1 supporting a passenger's head.

FIGS. 11-13 illustrate a passenger 1066 resting his head 1068 on the hammock portion 138A. As illustrated in these figures, the hammock portion 138A cradles the side of the head 1068 to restrain the head while the passenger 1066 is sleeping. In some embodiments, the hammock portion 138A allows the passenger 1066 to lean his head 1068 sideward without having to keep his head 1068 facing in a straight forward direction.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A passenger seat headrest comprising: a body comprising a forward side, an aft side distal from the forward side, a first side extending between the forward side and the aft side, and a second side distal from the first side and extending between the forward side and the aft side; and a side wing pivotably connected to the first side of the body, the side wing pivotable between a stowed position, at which the side wing is positioned against the forward side of the body, and a deployed position, at which the side wing is spaced apart from the forward side of the body.

EC 2. The passenger seat headrest of any of the preceding or subsequent example combinations, wherein the side wing is a first side wing, and wherein the passenger seat headrest further comprises: a second side wing pivotably connected to the second side of the body, the second side wing pivotable between a stowed position, at which the second side wing is positioned against the forward side of the body, and a deployed position, at which the second side wing is spaced apart from the forward side of the body.

EC 3. The passenger seat headrest of any of the preceding or subsequent example combinations, wherein an inner surface of the first side wing faces an inner surface of the second side wing when the first side wing and the second side wing are in the respective deployed positions.

EC 4. The passenger seat headrest of any of the preceding or subsequent example combinations, wherein the second side wing is pivotable independent from the first side wing.

EC 5. The passenger seat headrest of any of the preceding or subsequent example combinations, wherein the forward side of the body comprises a forward-facing surface, wherein the side wing comprises an inner surface and an outer surface, wherein the forward side of the body defines a first wing recess having a wing recess surface, and wherein in the stowed position, the inner surface of the side wing is positioned against the wing recess surface and the outer surface of the side wing is flush with the forward-facing surface of the body.

EC 6. The passenger seat headrest of any of the preceding or subsequent example combinations, wherein in the deployed position, the side wing is substantially perpendicular to the forward side of the body.

EC 7. The passenger seat headrest of any of the preceding or subsequent example combinations, further comprising: a dress cover secured to the body and the side wing and covering at least a portion of the forward side of the body and at least a portion of the side wing, wherein the dress cover defines a hammock portion.

EC 8. The passenger seat headrest of any of the preceding or subsequent example combinations, wherein the side wing comprises: a first side edge positioned proximate to the body; a second side edge distal from the first side edge; and an inner surface extending from the first side edge to the second side edge, wherein the hammock portion is secured to the front side of the body at a position about halfway between the first side of the body and the second side of the body, and wherein the hammock portion is secured to the inner surface of the side wing proximate to the second side edge.

EC 9. A passenger seat headrest comprising: a body comprising a forward side, an aft side distal from the forward side, a first side extending between the forward side and the aft side, and a second side distal from the first side and extending between the forward side and the aft side; a side wing pivotably connected to the first side of the body; and a dress cover covering at least a portion of the body, the dress cover defining a hammock portion connected to the body and to the first side wing.

EC 10. The passenger seat headrest of any of the preceding or subsequent example combinations, wherein the side wing is pivotable between a stowed position and a deployed position, wherein in the stowed position the side wing is positioned against the forward side of the body, and wherein in the deployed position the side wing is spaced apart from the forward side of the body.

EC 11. The passenger seat headrest of any of the preceding or subsequent example combinations, wherein the hammock portion of the dress cover is in a relaxed position when the side wing is in the stowed position and in a tensioned position when the side wing is in the deployed position, wherein in the relaxed position the hammock portion is folded between the side wing and the body, and wherein in the tensioned position a surface of the hammock portion defines a resting area between the side wing and the body.

EC 12. The passenger seat headrest of any of the preceding or subsequent example combinations, wherein the dress cover is constructed from leather.

EC 13. The passenger seat headrest of any of the preceding or subsequent example combinations, wherein the hammock portion is a first hammock portion, wherein the side wing is a first side wing, and wherein the passenger seat headrest further comprises: a second side wing pivotably connected to the second side of the body, wherein the dress cover defines a second hammock portion connected to the second side wing and the body.

EC 14. The passenger seat headrest of any of the preceding or subsequent example combinations, wherein the first side wing comprises: a first side edge positioned proximate to the body; a second side edge distal from the first side edge; and an inner surface extending from the first side edge to the second side edge, wherein the first hammock portion is secured to the front side of the body at a position about halfway between the first side of the body and the second side of the body, and wherein the first hammock portion is secured to the inner surface of the first side wing proximate to the second side edge.

EC 15. The passenger seat headrest of any of the preceding or subsequent example combinations, wherein the second side wing comprises: a first side edge positioned proximate to the body; a second side edge distal from the first side edge; and an inner surface extending from the first side edge to the second side edge, wherein the second hammock portion is secured to the front side of the body at a position about halfway between the first side of the body and the second side of the body, and wherein the second hammock portion is secured to the inner surface of the first side wing proximate to the second side edge.

EC 16. A passenger seat headrest comprising: a body; a side wing connected the body and pivotable between a deployed position and a stowed position; and a dress cover comprising a hammock portion connected to the body and to the side wing, the hammock portion movable between a relaxed position and a tensioned position, wherein in the relaxed position the hammock portion is folded between the side wing and the body, and wherein in the tensioned position a surface of the hammock portion defines a resting area between the side wing and the body.

EC 17. The passenger seat headrest of any of the preceding or subsequent example combinations, wherein the side wing is a first side wing, and wherein the passenger seat headrest further comprises: a second side wing connected to the body at a location distal from the first side wing, the second side wing pivotable between a deployed position and a stowed position, the second side wing pivotable independent from the first side wing.

EC 18. The passenger seat headrest of any of the preceding or subsequent example combinations, wherein the hammock portion is a first hammock portion, and wherein the dress cover further comprises: a second hammock portion connected to the body and to the second side wing, the second hammock portion movable independent from the first hammock portion and movable between a relaxed position and a tensioned position, wherein in the relaxed position the second hammock portion is folded between the second side wing and the body, and wherein in the tensioned position a surface of the second hammock portion defines a resting area between the second side wing and the body.

EC 19. The passenger seat headrest of any of the preceding or subsequent example combinations, wherein the side wing is connected to the body through a torque hinge, and wherein the torque hinge comprises a detent.

EC 20. The passenger seat headrest of any of the preceding or subsequent example combinations, wherein the body comprises a forward side defining a forward-facing surface and a wing recess surface, wherein the side wing comprises an inner surface and an outer surface, and wherein in the stowed position, the inner surface of the side wing is positioned against the wing recess surface and the outer surface of the side wing is flush with the forward-facing surface of the body.

It should be emphasized that the above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims which follow, they are used only in a generic and descriptive sense, and not for the purposes of limiting the described invention, nor the claims which follow.

That which is claimed is:

1. A passenger seat headrest comprising:
   a headrest body comprising a forward side, an aft side opposite from the forward side, a first side edge extending between the forward side and the aft side, and a second side edge opposite from the first side edge;
   a side wing pivotably connected to the headrest body and movable between a stowed position and a deployed position; and
   a dress cover comprising a hammock portion, the hammock portion comprising:
      a forward edge comprising:
         a first end connected to the forward side of the headrest body between the first side edge and the second side edge of the headrest body; and
         a second end connected to the side wing such that the hammock portion is suspended between the forward side of the headrest body and the side wing;
      a first surface extending from the forward edge towards the headrest body; and
      a second surface opposite from the first surface and extending from the forward edge towards the headrest body,
      wherein the hammock portion is moveable relative to the headrest body between a deployed position and a stowed position, and
      wherein the first surface of the hammock portion is configured to retain a head of a passenger when the side wing is in the deployed position.

2. The passenger seat headrest of claim 1, wherein:
   the hammock portion is a first hammock portion;
   the side wing is a first side wing and is pivotably connected to the first side edge of the headrest body;
   the passenger seat headrest further comprises a second side wing pivotably connected to the second side edge of the headrest body; and
   the dress cover further comprises a second hammock portion comprising:
      a forward edge connected to the second side wing and the forward side of the headrest body;
      an upward-facing surface; and
      a downward-facing surface opposite from the upward-facing surface, wherein the upward-facing surface of the second hammock portion is configured to retain a head of a passenger when the second hammock portion is in a deployed position.

3. The passenger seat headrest of claim 2, wherein the second side wing is pivotable independent from the first side wing.

4. A passenger seat headrest comprising:
   a headrest body comprising a forward side, an aft side opposite from the forward side, a first side edge extending between the forward side and the aft side, and a second side edge opposite from the first side edge;
   a side wing pivotably connected to the headrest body; and
   a dress cover covering at least a portion of the forward side of the headrest body, the dress cover comprising a hammock portion, the hammock portion comprising:
      a forward edge comprising:
         a first end connected to the forward side of the headrest body between the first side edge and the second side edge of the headrest body; and
         a second end connected to the side wing such that the hammock portion is suspended between the forward side of the headrest body and the side wing,
      wherein the hammock portion is moveable relative to the headrest body between a deployed position and a stowed position,
      wherein, in the deployed position, the second end of the forward edge of the hammock portion is spaced apart from the forward side of the headrest body; and
      wherein, in the stowed position, the second end of the forward edge of the hammock portion is positioned proximate to the forward side of the headrest body.

5. The passenger seat headrest of claim 4, wherein the hammock portion further comprises:
   a first surface extending from the forward edge towards the headrest body; and
   a second surface opposite from the first surface and extending from the forward edge towards the headrest body,
   wherein, in the deployed position, the second surface of the hammock portion is downward-facing and the first surface is upward-facing, and
   wherein, in the stowed position, the first surface faces the forward side of the headrest body and the second surface faces away from the forward side of the headrest body.

6. The passenger seat headrest of claim 4, wherein the hammock portion is a first hammock portion, and wherein the dress cover further comprises a second hammock portion, the second hammock portion comprising:
   a forward edge;
   a first surface extending from the forward edge of the second hammock portion towards the headrest body; and
   a second surface opposite from the first surface of the second hammock portion and extending from the forward edge of the second hammock portion towards the headrest body,
   wherein the second hammock portion is moveable relative to the headrest body between a deployed position and a stowed position, and
   wherein, in the deployed position, the first surface of the second hammock portion is upward-facing.

7. The passenger seat headrest of claim 6, wherein the second hammock portion is movable independent from the first hammock portion.

8. The passenger seat headrest of claim 6, wherein, in the deployed position of the first hammock portion, the forward edge of the first hammock portion extends forward at a first angle relative to the forward side of the headrest body, and, wherein, in the deployed position of the second hammock portion, the forward edge of the second hammock portion extends forward at a second angle that is different from the first angle relative to the forward side of the headrest body.

9. A passenger seat headrest comprising:
a headrest body comprising a forward side, an aft side opposite from the forward side, a first side edge extending between the forward side and the aft side, and a second side edge opposite from the first side edge;
a side wing pivotably connected to the headrest body; and
a dress cover at least partially connected to the headrest body, wherein the dress cover comprises a hammock portion, the hammock portion comprising:
  a forward edge comprising:
    a first end connected to the forward side of the headrest body between the first side edge and the second side edge of the headrest body; and
    a second end connected to the side wing such that the hammock portion is suspended between the forward side of the headrest body and the side wing;
  a first surface extending from the forward edge towards the headrest body; and
  a second surface opposite from the second surface and extending from the forward edge towards the headrest body,
wherein the hammock portion is moveable relative to the headrest body between a deployed position and a stowed position, and
wherein, in the deployed position, the first surface is upward-facing and the second surface is downward-facing.

10. The passenger seat headrest of claim 9, wherein the side wing is movable relative to the headrest body between a stowed position and a deployed position, wherein, in the deployed position, at least a portion of the side wing is spaced apart from the headrest body, and wherein, in the stowed position, the side wing is positioned against the forward side of the headrest body.

11. The passenger seat headrest of claim 10, wherein at least a portion of the hammock portion is positioned between the side wing and the forward side of the headrest body when the side wing is in the stowed position.

12. The passenger seat headrest of claim 10, wherein the forward side of the headrest body comprises a neck portion extending in a forward direction from the forward side of the headrest body, and wherein at least a portion of the neck portion is forward of the side wing when the side wing is in the stowed position.

13. The passenger seat headrest of claim 9, wherein the hammock portion is a first hammock portion, and wherein the dress cover further comprises a second hammock portion, the second hammock portion comprising:
  a forward edge;
  a first surface extending from the forward edge of the second hammock portion towards the headrest body; and
  a second surface opposite from the first surface of the second hammock portion and extending from the forward edge of the second hammock portion towards the headrest body,
wherein the second hammock portion is moveable relative to the headrest body between a tensioned position and a stowed position, and
wherein, in the tensioned position, the first surface of the second hammock portion is upward-facing.

14. The passenger seat headrest of claim 13, wherein the second hammock portion is movable independent from the first hammock portion.

15. The passenger seat headrest of claim 9, wherein, in the stowed position, a portion of the first surface of the hammock portion faces the forward side of the headrest body and a portion of the second surface faces away from the forward side of the headrest body.

* * * * *